Aug. 21, 1928.
F. W. SLACK
1,681,748
TIRE CARRIER
Filed July 25, 1925
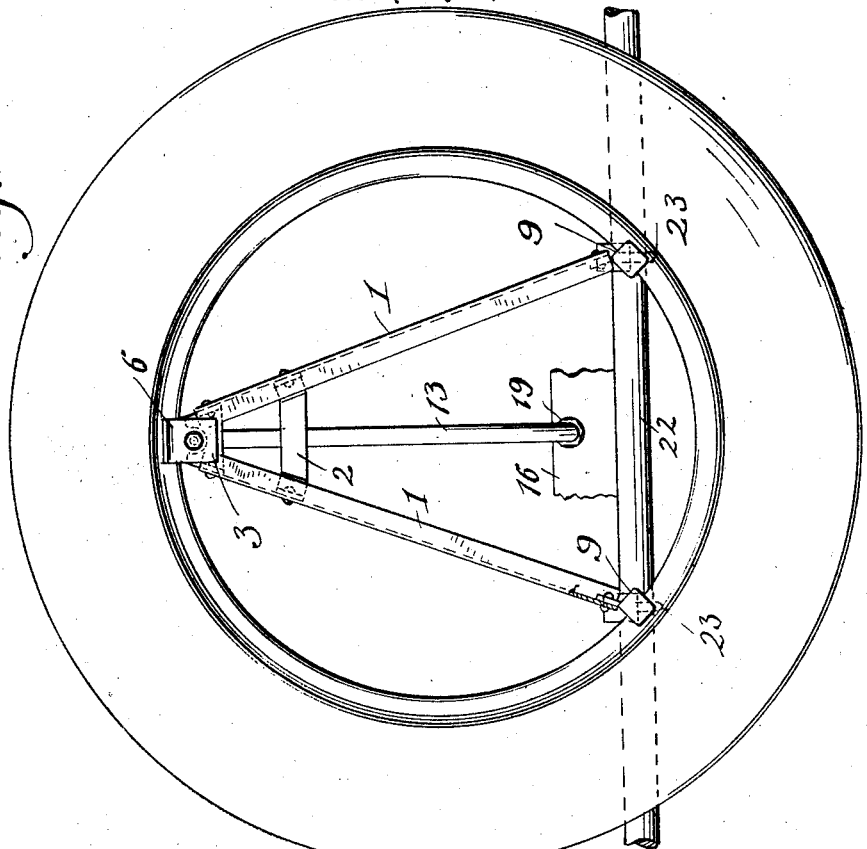
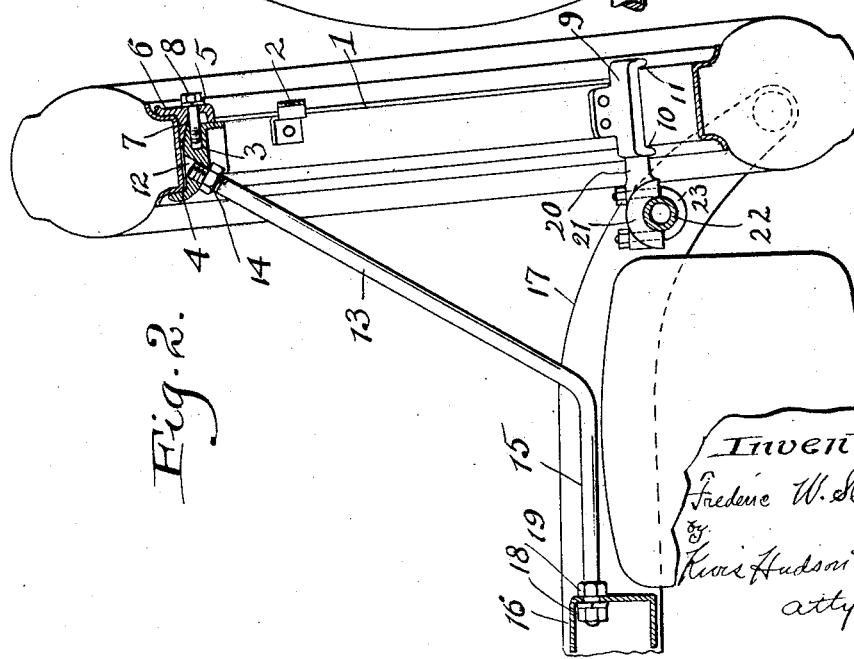
Inventor
Frederic W. Slack
by
Rivis Hudson & Kent
attys.

Patented Aug. 21, 1928.

1,681,748

UNITED STATES PATENT OFFICE.

FREDERIC W. SLACK, OF CLEVELAND, OHIO, ASSIGNOR, BY MESNE ASSIGNMENTS, TO THE PEERLESS MOTOR CAR CORPORATION, OF CLEVELAND, OHIO, A CORPORATION OF VIRGINIA.

TIRE CARRIER.

Application filed July 25, 1925. Serial No. 45,983.

This invention relates to tire carriers and has for an object to provide a carrier of simple and inexpensive construction which provides a rigid rim support and permits a rim to be easily put in place thereon or to be detached therefrom.

A further object is to provide a tire carrier which may be adjusted, when attached to the automobile, to fit perfectly within a rim mounted thereon and held in such adjusted position by the securing means.

With the above and other objects in view the invention may be said to comprise the device as illustrated in the accompanying drawings hereinafter described and particularly set forth in the appended claims, together with such variations and modifications thereof as will be apparent to one skilled in the art to which the invention appertains.

Reference should be had to the accompanying drawings, forming a part of this specification, in which Fig. 1 is a rear elevation showing the tire carrier with a rim and tire thereon; and Fig. 2 is a central vertical section through the tire carrier showing the means by which the carrier is attached to an automobile frame.

Referring to the accompanying drawings, the tire carrier has a rim receiving frame which is in the form of an inverted V and consists of two downwardly diverging bars 1, which are connected adjacent their upper ends by a cross bar 2. At the apex of the V, the two bars are connected to an upper rim receiving member 3, which has a seat upon which the interior of a tire receiving rim rests and with an inner flange 4 integral therewith against which the inner side of the rim bears when the rim is in place on the carrier. For releasably retaining a rim, the member 3 is provided with a detachable clip 5, which has a rim engaging flange 6 which bears against the outer side of the rim and a wedge flange 7 which bears against an inclined edge portion of the member 3. The clip 5 is detachably secured to the member 3 by means of a bolt 8.

Each of the bars 1 of the carrier frame has attached to its lower free end a rim receiving member 9, which is provided with inner and outer rim retaining flanges 10 and 11. In placing the rim upon the carrier, it is first placed in engagement with the lower retaining members 9 and then swung into place upon the upper rim supporting member 3. When the rim is so positioned on the carrier, it may be secured thereto by fastening the clip 5 in place on the upper supporting member 3.

The rim supporting member 3 of the carrier frame is provided with an inclined screw threaded opening 12 which receives the upper threaded end of a brace rod 13, the brace rod 13 being provided with a lock nut 14, adapted to be screwed into engagement with the supporting member 3. The outer end of the brace rod 13 is inclined rearwardly and upwardly to the rim supporting member 3 and the opposite end portion 15 extends horizontally and is attached to a cross bar 16 which extends between the side frame members 17 of the automobile frame, the brace rod being connected to the cross bar 16 by means of clamping nuts 18 and 19 engaging opposite sides of the bar. Each of the rim retaining members 9 has a forwardly projecting arm 20, formed integrally therewith, which is provided on its under side with a transverse concavity forming a seat 21 adapted to receive a tubular cross bar 22 which extends between the side members 17 of the automobile frame and rearwardly of the cross bar 16. The arms 20 are rigidly secured to the cross bar 22 by means of U-bolts 23, which embrace the tubular bar 22 and clamp the same in the seats 21 of the arms 20.

An important feature of the present invention is that the carrier frame is adapted to be adjusted, when secured to the automobile frame, to fit rims of various sizes. Before the U-bolts 23 are tightened on the tubular cross bar 22, the arms 20 may be moved along the bar 22 permitting the arms 1 to be sprung apart or toward each other. A rim of the size to be secured upon the carrier may be placed on the carrier frame and the retaining members 9 may then be adjusted to positions in which they exactly fit the rim. The U-bolts 23 may then be tightened to rigidly secure the rim retaining members in adjusted positions.

Having thus described my invention, I claim:

1. A tire carrier comprising a V-shaped frame formed by a pair of diverging bars secured together at their converging ends, rim retaining means carried by the frame at the apex of the V and at the free ends of said bars, and means for rigidly securing said V-shaped frame to an automobile and for adjusting the free ends of the bars one with respect to the other.

2. A tire carrier comprising a V-shaped frame formed by a pair of diverging bars secured together at their converging ends, rim retaining means carried by the frame at the apex of the V and at the free ends of said bars, means for securing the apex of the V-shaped frame to an automobile, and separate means for adjustably securing the free end of each of said bars independently to the automobile.

3. A tire carrier comprising a V-shaped frame formed by a pair of diverging bars secured together at their converging ends, rim retaining means carried by the frame at the apex of the V and at the free ends of said bars, and means for rigidly securing said V-shaped frame to an automobile comprising a brace member attached to the apex of the frame and independently adjustable attaching members carried by the free ends of the bars.

4. The combination with an automobile frame having side bars, a cross bar connecting the side bars adjacent their rear ends and a second cross bar spaced forwardly from the first, of a tire carrier comprising a V-shaped frame formed by a pair of diverging bars secured together at their upper ends, rim retaining means carried by the V-shaped frame at the apex thereof and at the free ends of the bars, a brace member connecting the apex of the frame to the forward cross bar, and means for rigidly securing the free ends of the diverging bars to the rear cross bar and for adjusting said ends one toward and from the other.

5. The combination with an automobile frame having side bars, a cross bar connecting the side bars adjacent their rear ends and a second cross bar spaced forwardly from the first, of a tire carrier comprising a V-shaped frame formed by a pair of diverging bars secured together at their upper ends, rim retaining means carried by the V-shaped frame at the apex thereof and at the free ends of the bars, a brace member connecting the apex of the frame to the forward cross bar, and means for rigidly securing the free ends of the diverging bars to the rear cross bar, said means being adjustable on the cross bar to permit adjustment of the free ends of the bars, one with respect to the other.

6. The combination with the frame of an automobile, of a tire carrier comprising, an upper rim seat having an inner rim retaining flange and an outer removable rim retaining flange, a brace member secured to said rim seat and to said automobile frame, diverging bars secured at their upper ends to said rim seat, rim seats carried by the lower free ends of said bars, said rim seats having inner and outer rim retaining flanges, and means for adjustably securing the free ends of said bars to the automobile frame.

In testimony whereof, I hereunto affix my signature.

FREDERIC W. SLACK.